July 6, 1926.
D. A. CUTLER
1,591,018
MANUFACTURE OF CORK RUBBER COMPOSITION FOR SHOE SOLES, ETC
Filed June 29, 1925
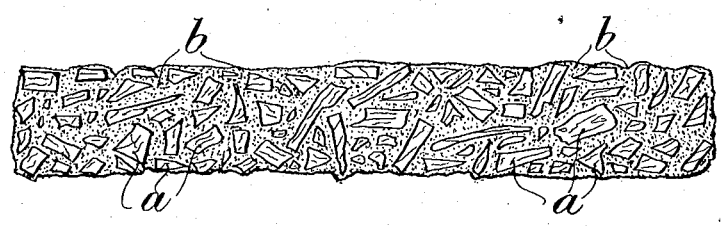
INVENTOR
David A. Cutler
BY
Redding, Greeley, O'Shea Campbell
ATTORNEYS Patented July 6, 1926.

1,591,018

UNITED STATES PATENT OFFICE.

DAVID A. CUTLER, OF WOLLASTON, MASSACHUSETTS, ASSIGNOR TO ALFRED HALE RUBBER COMPANY, OF ATLANTIC, MASSACHUSETTS, A CORPORATION OF MASSACHUSETTS.

MANUFACTURE OF CORK-RUBBER COMPOSITION FOR SHOE SOLES, ETC.

Application filed June 29, 1925. Serial No. 40,131.

Many efforts have been made in the past to realize in a composition especially adapted for use as soles for shoes, the lightness and resilience of cork and the toughness, elasticity and water-resisting quality of rubber. Heretofore, it has been thought to be impossible to produce a durable mixture of granulated cork and rubber without destroying the desirable qualities of one ingredient or the other, especially of the cork and without leaving the cork exposed to attrition. In the efforts to solve the problem, it has been found, in the present invention, that the desired results can be secured by combining the granulated cork with rubber latex in its otherwise natural but preferably somewhat thickened condition and prior to coagulation of the caoutchouc suspended in the watery content of the latex. The invention will be more fully explained hereinafter.

The single figure of the drawing represents, as far as the same is capable of representation, a cross section of a sheet of a finished composition.

In the drawing the particles of granulated cork are indicated at $a$ and the including latex at $b$.

In practicing the invention, the latex is preferably thickened somewhat by elimination of a portion of its watery content so that in the thickened latex the caoutchouc content is increased from the usual 35 percentum or thereabouts, to about 60 percentum. Otherwise than by the elimination of a portion of the watery content, the latex remains in its natural condition, with the caoutchouc in suspension in the remaining watery content, without any coagulation of the caoutchouc. Into the thickened latex there is then mixed the granulated cork, the particles of which are completely covered by or included in the latex. The mixture is then placed in suitable molds, according to the purposes for which it is to be used, such as molds for shoe soles, and is subjected therein to considerable pressure, say about 2000 pounds to the square inch. Prior to the application of the pressure, there is no coagulation of the caoutchouc, but under the pressure such coagulation proceeds and also under such pressure the particles of cork are compressed. When coagulation has proceeded and the pressure is relieved, the particles of cork expand within the enveloping and at least partially coagulated latex, placing the enveloping latex under tension. On the exposure of the compound to the air after removal from the mold the coagulation of the latex is completed, if not already completed, and the article is then ready for use. It is essential to the attainment of the desired results that the latex be not coagulated, at any rate to a substantial extent, before the mixing of the granulated cork therewith, and that the coagulation of the latex proceed under pressure in order that the granules of cork may be compressed and subsequently expand. It will be understood, of course, that there is no saturation of the cork granules by the latex and there is, therefore, no change in the character of the cork which reduces its natural qualities. It will be understood, also, that the coagulated latex has all of its expected and desirable qualities.

I claim as my invention:

The method of making a composition of granulated cork and latex, which consists in mixing the granulated cork with the latex without coagulation, subjecting the mixture to pressure while coagulation of the latex proceeds, and subsequently relieving the mixture of pressure.

This specification signed this 27th day of June, A. D. 1925.

DAVID A. CUTLER.